United States Patent
Tönnigs et al.

(10) Patent No.: US 7,032,738 B2
(45) Date of Patent: Apr. 25, 2006

(54) DEVICE FOR RETURNING WORKPIECES

(75) Inventors: Bodo Tönnigs, Lichtenberg (DE); Dietmar Kaden, Mulda (DE)

(73) Assignee: Ligmatech Automationssysteme GmbH, Litchtenberg (DE)

( * ) Notice: Subject to any disclaimer, the term of this patent is extended or adjusted under 35 U.S.C. 154(b) by 0 days.

(21) Appl. No.: 10/477,036

(22) PCT Filed: Mar. 13, 2002

(86) PCT No.: PCT/EP02/02799

§ 371 (c)(1),
(2), (4) Date: Apr. 12, 2004

(87) PCT Pub. No.: WO02/090044

PCT Pub. Date: Nov. 14, 2002

(65) Prior Publication Data

US 2004/0168884 A1   Sep. 2, 2004

(30) Foreign Application Priority Data

May 9, 2001 (DE) ................................ 101 22 377

(51) Int. Cl.
*B65B 37/00* (2006.01)
(52) U.S. Cl. .................. 198/463.3; 198/468.6
(58) Field of Classification Search ............ 198/463.3, 198/468.6, 576, 570
See application file for complete search history.

(56) References Cited

U.S. PATENT DOCUMENTS

| | | | | |
|---|---|---|---|---|
| 3,690,435 A | * | 9/1972 | King et al. ............... | 198/463.3 |
| 3,746,148 A | * | 7/1973 | Hilger et al. ............. | 198/774.1 |
| 4,987,992 A | | 1/1991 | Pfleger .................... | 198/475.1 |
| 5,452,981 A | * | 9/1995 | Crorey et al. ............ | 198/468.6 |
| 5,922,230 A | * | 7/1999 | Yokota ...................... | 219/388 |

(Continued)

FOREIGN PATENT DOCUMENTS

DE   24 38 960 A1   2/1976

(Continued)

OTHER PUBLICATIONS

English Abstract (European Patent Office) of Japanese Appl. No. 58059639 (one page).

*Primary Examiner*—Gene O. Crawford
*Assistant Examiner*—Rashmi Sharma
(74) *Attorney, Agent, or Firm*—Finnegan, Henderson, Farabow, Garrett, & Dunner, L.L.P.

(57) ABSTRACT

The invention relates to a device for returning machined workpieces from the delivery side of a first machining unit to the feeding side of the first or of another machining unit. The inventive device comprises the following: a transfer device (1) for transferring the machined workpieces to the delivery side of the first machining unit; a lifting device for lifting the workpieces, which are delivered by the transfer unit, into a return position located above the transfer unit, and; a return device (2) for conveying the workpieces, which are delivered by the lifting device, back to the feeding side of the first or the other machining unit. The transfer device (1) comprises a transfer table with interspaced first supporting elements (4) for the workpieces. The lifting device comprises at least one lifting table (3, 3', 3") that, in turn, has interspaced second support elements (5), which can be upwardly guid through between the first support elements (4) of the transfer table. The lifting device comprises at least one drive unit (7, 8), which moves the at least one lifting table (3, 3',3") in a rotary motion from the transfer table upwards to the return position and back to the transfer table.

25 Claims, 9 Drawing Sheets

U.S. PATENT DOCUMENTS 6,752,258 B1 * 6/2004 Ludwig et al. .......... 198/465.3

FOREIGN PATENT DOCUMENTS

| | | |
|---|---|---|
| DE | 35 39 723 A1 | 5/1987 |
| DE | 40 24 639 A1 | 2/1992 |
| DE | G 93 07 220.1 | 9/1993 |
| DE | 195 34 954 A1 | 3/1997 |
| DE | 200 16 186 U1 | 1/2001 |
| EP | 0 608 171 A1 | 7/1994 |
| EP | 0 999 152 A1 | 5/2000 |
| EP | 1 034 879 A1 | 9/2000 |
| GB | 886682 | 1/1962 |

* cited by examiner

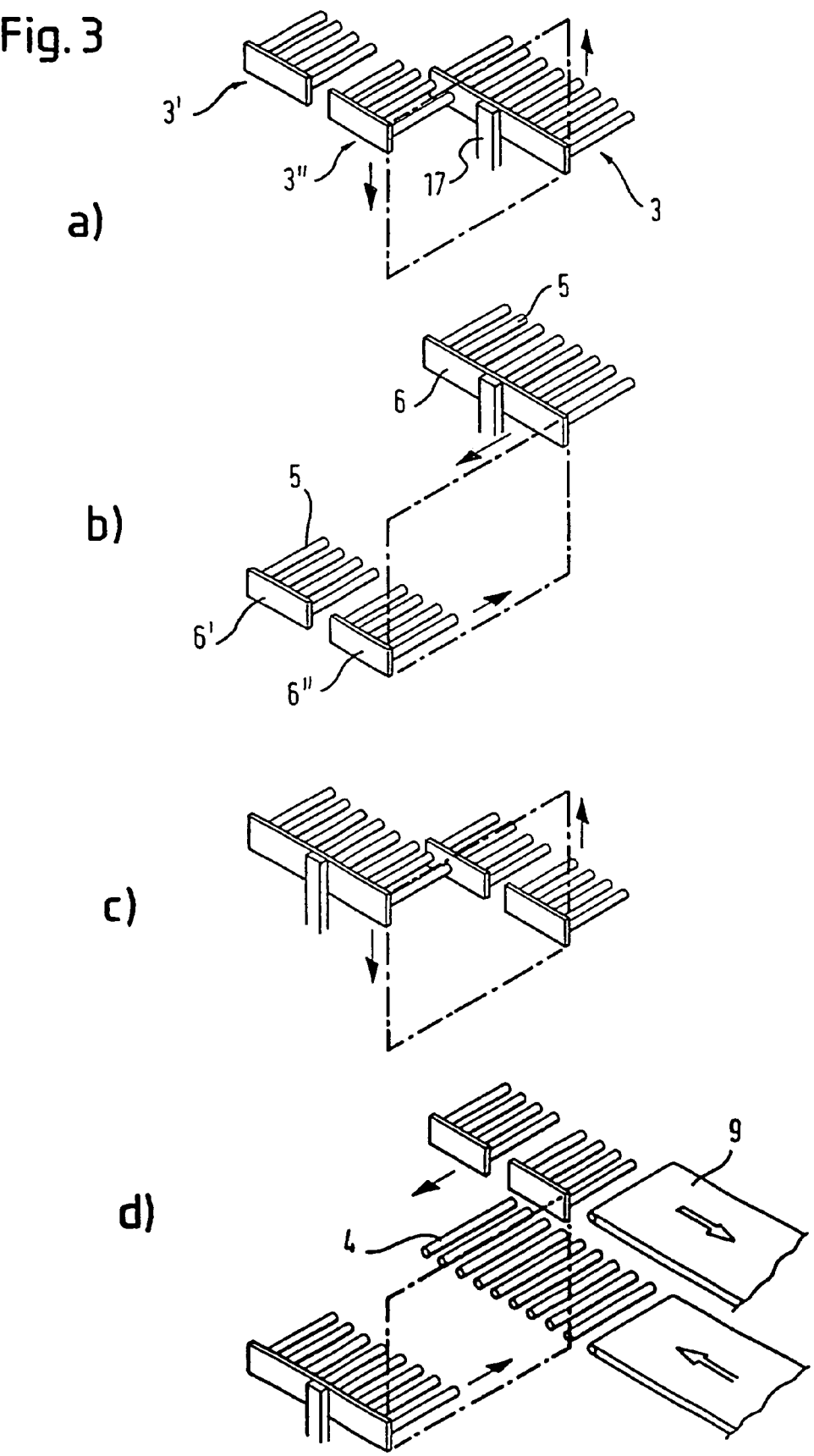

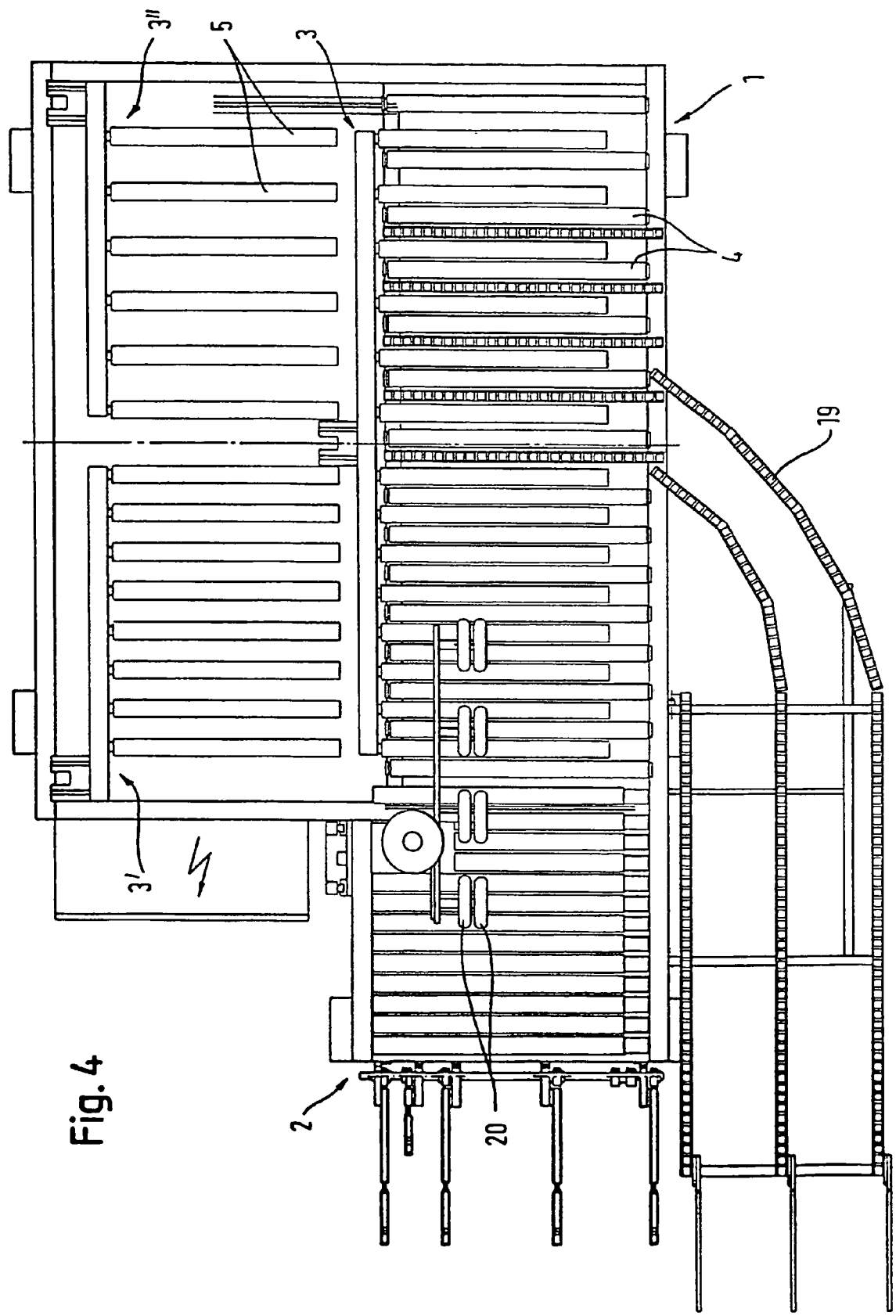

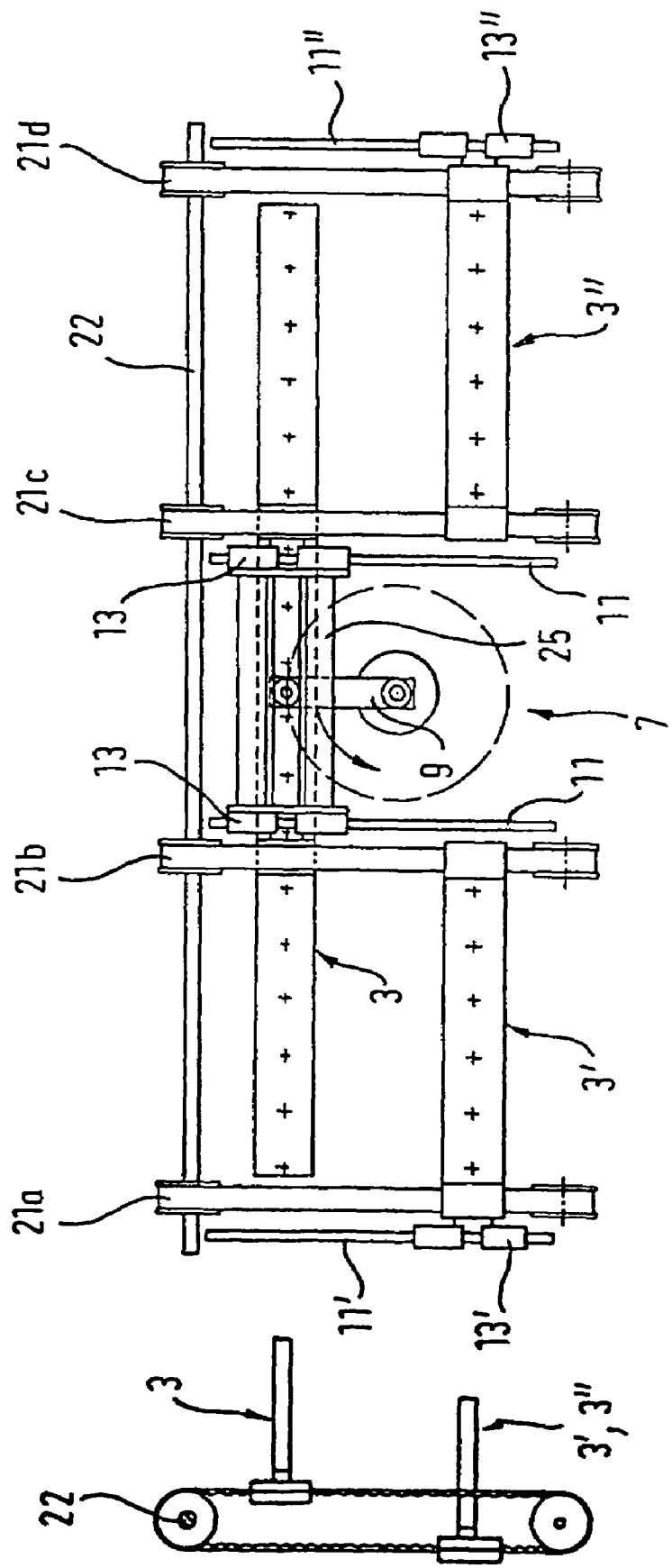

000
DEVICE FOR RETURNING WORKPIECES

FIELD OF THE INVENTION

The invention relates to a device for returning machined workpieces from the delivery side of a first machining unit to the feeding side of the first or of another machining unit. The device comprises a, transfer device for transferring the machined workpieces from the delivery side of the first machining unit, a lifting device for lifting the workpieces which are delivered by the transfer unit into a return position located above the transfer unit, and a return device for conveying the workpieces which are delivered by the lifting device back to the feeding side of the first or the other machining unit.

During the machining of workpieces, preferably panel-shaped, strip-shaped or batten-shaped workpieces that are in particular made of wood, wood-like materials or plastics, it is often necessary to perform the machining of a workpiece on a machining unit several times. Here, a machining unit should be understood to mean primarily one or more machining stations or so-called continuous machines. In continuous machines, different machining processes are performed on one side edge of the workpiece in one pass.

This kind of machining of the side edges of a workpiece is, for example, necessary for furniture parts or kitchen panels that have to be machined on all four side edges or edge areas in order, for example, to glue on and machine an edge. Since these machines generally have a relatively large longitudinal extension, it is necessary to return the workpieces back to the feeding side after one or more machining stages.

PRIOR ART

The simplest possibility for returning the workpieces consists in installing an operator at each of the two ends of the machining unit; one to insert the workpieces on the feeding side and the other to remove the machined workpieces at the delivery side of the machining unit and transport them back to the feeding side manually, individually or in stacks. However, a procedure of this kind is time-consuming and cost-intensive and prevents the optimum utilisation of the machining unit.

For this reason, several returning devices have been developed:

In one known embodiment, the workpieces are placed at the end of the machining unit on a roller conveyor guided in a semicircle which rotates the workpieces in the horizontal plane by 180°. Connected to the roller conveyor is a return conveyor running parallel to the machining conveyor which conveys the workpieces back to the feeding side.

According to the German utility model G 200 16 186, in place of the roller conveyor guided in a semicircle, an offsetting device is provided between the machining conveyor and the adjacent return conveyor: after machining in the machining unit, the workpieces are transferred to the delivery side by driven rollers and supporting bars in the offsetting device are led upward between these rollers and lift the workpiece. The supporting bars are then offset laterally together with the workpiece and deposit the workpiece on the return conveyor.

Return devices of this type in which the return conveyor is substantially at the same height as the machining conveyor and runs next to the machining conveyor require a large amount of space at the side of the machining device on the one hand and, on the other, the return conveyor becomes very dirty since, particularly in the woodworking industry, extremely fine shavings or similar are produced continuously during the machining. Therefore, the return conveyor requires a large amount of maintenance entailing high costs.

In order to resolve these problems, the return device according to the German utility model G 93 07 220.1, the disclosure of which is hereby claimed completely as the subject matter of this application, the return conveyor is arranged above the machining conveyor. Connected to the machining conveyor is a transfer device for the workpiece and between the transfer device and the return conveyor there is a lifting device to lift the workpieces into a return position above the delivery height. Here, the lifting device has a lifting table, which is vertically adjustable for example, by means of a scissor gate which is driven by hydraulic or pneumatic cylinders. Here, between the return position and the feeding side, the return conveyor is preferably inclined relative to the horizontal so that the machined workpieces are conveyed back to the feeding side by means of gravity.

This solution has the advantage that the previously unused space above the machining arrangement is used for the return of the workpieces. The space required for the return device is greatly reduced and a dense configuration of the machining units in a production shop is possible. In addition, the return device may be added to existing machining devices. Since the return conveyor runs above the machining conveyor, shavings produced during the machining do not settle as easily on the return conveyor so that less maintenance is required for the return conveyor.

If a high throughput is required during the machining, however, the control of the return device and the necessary synchronisation between the machining unit and return device is relatively complicated. In addition, the possible throughput is restricted by the fact that the lifting table always has to return completely to its original position before it is able to accept the next workpiece to be lifted.

SUMMARY OF THE INVENTION

This invention is based on the object of improving the known return device with a return conveyor above the machining conveyor and a lifting table so that the cycle speed may be increased without requiring complex controls and the lifting movement harmonised.

This technical problem is resolved by a device for returning machined workpieces from the delivery side of a first machining unit to the feeding side of the first or of another machining unit, said device comprising: a transfer device for transferring the machined workpieces from the delivery side of the first machining unit, a lifting device for lifting the workpieces which are delivered by the transfer unit into a return position located above the transfer unit, and a return device for conveying the workpieces which are delivered by the lifting device back to the feeding side of the first or the other machining unit characterised in that the transfer device comprises a transfer table with interspaced first supporting elements for the workpieces, that the lifting device comprises at least one lifting table that has interspaced second supporting elements which can be upwardly guided between the first supporting elements of the transfer table, and that the lifting device comprises at least one drive unit which moves the at least one lifting table in a rotary motion from the transfer table upward to the return position and back to the transfer table.

According to this, the transfer device comprises a transfer table with interspaced first supporting elements for the workpieces. The lifting device comprises at least one lifting table that has interspaced second supporting elements which can be upwardly guided between the first supporting elements of the transfer table. The lifting device comprises at least one drive unit which moves the at least one lifting table in a rotary motion from the transfer table upward to the return position and back to the transfer table.

Hereby, the lifting table is configured as a rake whereby the lifting table's supporting elements are arranged as the prongs of said rake. Since the transfer table also comprises interspaced supporting elements, the lifting table may be guided upward through the transfer table and during its upward movement remove a workpiece from the transfer table. As soon as the lifting table has removed the workpiece from the transfer table, the next workpiece can move onto the transfer table where it is then in a position from which it may be lifted by the lifting table. In contrast to this, the workpiece in the known devices may only be brought into this position when the lifting table has returned to its original position.

Therefore, the lifting device moves the lifting table's supporting elements upward between and through the supporting elements of the fixed transfer table so that the lifting table conveys a workpiece on the transfer table upward until a return position is achieved. In this return position, the workpiece is then transferred by the lifting table to the return device.

Following the transfer of the workpiece by the lifting table to the return device, the lifting table is guided in a horizontal movement backward out of the area above the transfer table, then moves upward and then forward so that its supporting elements once again reach between the transfer table's supporting elements and during the subsequent upward movement are able to remove the next workpiece from the transfer table.

The movement of the lifting table is consequently a rotary motion in which the lifting table moves in a circuit starting from the transfer table upward, back, downward and then forward once again to the transfer table.

Advantageous further embodiments of the return device according to the invention are described in the other claims.

The rotary motion of the lifting table may comprise a oscillating up and down movement (lifting movement) and a superposed horizontal oscillating movement.

This is preferably a two-dimensional rotary motion in one plane vertical to the transport direction of the workpieces. Following the actual lifting process, the lifting table is then moved backward, downward and forward again in an area behind the machining conveyor so that the longitudinal extension of the machining conveyor does not increase.

The transfer table is preferably a fixed transfer table through the supporting elements of which the lifting table may be guided.

As described above, the two-dimensional movement of the lifting table may be comprised of an oscillating up and down movement and an oscillating horizontal movement. In this case, preferably separate drive units are provided for these two oscillating movements, to be precise a first drive unit to produce the oscillating up and down movement and a second drive unit to produce the oscillating horizontal movement.

In an advantageous embodiment of the device according to the invention, at least one drive unit comprises a crank mechanism. In this case, preferably both the up and down movement and the horizontal movement of the lifting table are produced by a crank mechanism in each case.

This facilitates a simplified drive mechanism for the lifting table using conventional drive motors. The crank mechanisms ensure that rotary movements are converted into a translatory up and down or horizontal movement.

If the horizontal movement of the lifting table is produced by means of the crank mechanism, advantageously, there is a smooth start of the lifting table which prevents any workpieces on the lifting table being displaced on the lifting table or even falling off due to their inertia. Following this smooth start, the lifting movement is accelerated and hence a high workpiece conveying speed achieved in order to obtain a sufficiently high cycle speed in the return device. Subsequently, the workpieces are smoothly braked at the end of the lifting movement so that they may be reliably transferred to the return device.

If the horizontal movement of the lifting table is also produced by a crank mechanism, this horizontal movement has a similarly advantageous course.

The crank mechanism therefore guarantees a soft start followed by a high conveying speed and the subsequent soft braking of the workpieces on the lifting table without requiring a complex electrical, pneumatic or hydraulic control. Consequently, the crank mechanism is a simple means of facilitating a particularly advantageous conveying profile for the workpieces whereby due to the conversion of a rotational movement into a translatory movement, the profile of the speed of the workpieces corresponds to a subarea of the sine or cosine function.

According to an advantageous embodiment, the crank mechanism comprises a driven rotational axis to which a crank is rotationally attached. The free end of the crank is then preferably guided in a running rail coupled to at least one lifting table so that the oscillating movement of the running rail is transferred to the lifting table.

Preferably, the running rail comprises hardened bars to accept the free end of the crank which in particular are glued into place. This reduces the friction between the moving parts to increase the lifetime of the device. The gluing-in facilitates the assembly of the bars in the running rail.

Advantageously, the free end of the crank supports a roller that may be moved in a longitudinal direction in the running rail. This reduces the friction between the crank end and the running rail and thus increases the efficiency of the device.

However, in place of the crank mechanism, other types of drive, such as, for example hydraulic or pneumatic drives are feasible to produce the movement of the lifting table.

Although these drive units may in principle be controlled independently of each other so that the up and down movement of the lifting table may in principle take place independently of its horizontal movement, it is advantageous to couple the two drive units in such a way that the lifting table performs the partial movements of the above-described cycle "upward, back—downward—forward" in sequence: when there is a workpiece on the transfer table, the first drive unit first produces the upward movement, then the second drive unit produces the backward horizontal movement this is followed by the downward movement produced by the first drive unit and the forward movement produced by the second drive unit. Therefore, the two drive units work in alternation with each other.

If the two drive units have crank mechanisms, the cranks in the crank mechanisms then alternately perform half revolutions.

To control and synchronise the two drive units, preferably a higher-level control is provided.

Here, the transfer table is preferably equipped with a sensor which transmits a signal to the higher-level control when there is a workpiece on the transfer table. The higher-level control then controls the first drive unit so that this produces the upward movement of the lifting table. The coupling of the two drive units then preferably takes place electronically by means of end-position sensors: when the upward movement of the lifting table has finished, a suitably attached end-position sensor transmits a signal to the higher-level control which then switches off the first drive unit and controls the second drive unit, which produces the horizontal movement of the lifting table backward. End-position sensors to detect the end positions of the lifting table after the movements "back", "down" and "forward" are also suitably attached.

In order to transfer the movements produced by the drive units to the lifting table, means for coupling the lifting table to every drive unit are provided. These are in particular slides which are each moved back and forth by a drive unit and at the same time attached to the lifting table. Here, the movements of the slides are preferably guided in guide rails.

The guide rails in the second drive unit are here preferably arranged horizontally. The guide rails in the first drive unit for the production of the lifting movement may be arranged vertically or inclined relative to the vertical.

If the drive units comprise crank mechanisms, preferably at least one slide in a drive unit is connected to the running rail of the associated crank mechanism. The running rail's oscillating movement is then transferred to the slide and to the lifting table connected thereto.

In the embodiment with a first drive unit for the up and down movement and a second drive unit for the horizontal movement, each of the two drive units then have at least one slide for each lifting table provided. Here, preferably drivers are provided on the slides and the lifting tables are mounted on this driver with a degree of freedom. In this way, the oscillating movement of the slide, i.e. the up and down movement of the slides in the first drive unit, or the oscillating movement of the slides in the second drive unit is continuously transferred to the lifting table. During its up and down movement, the lifting table is able to move along on the driver on the slide in the second drive unit; during the horizontal movement, it slides along on the driver on the slide in the first drive unit.

Here, the driver should be configured so the oscillating movement in question may be transferred to the lifting table, regardless of the point of the cycle in which the lifting table currently finds itself. In particular, therefore, it must be possible to transfer the horizontal movement of the slide in the second drive unit to the lifting table, regardless of whether the lifting table is at the return height or the height of the transfer table. In a similar way, it must be possible for the up and down movement of the slide in the first drive unit to be transferred to the lifting table, regardless of whether the lifting table is currently moving forward and upward with a workpiece or downward and empty in the rear area.

In an advantageous embodiment of the invention, the drivers are therefore configured as rods and attached to the lifting tables are rollers by means of which the lifting tables are mounted on the drivers. The drivers may also be configured as rails. In this case, a suitable guide element is provided on each lifting table which is able to move along on the rail.

The cycle speed of the return device according to the invention may be significantly further increased if two lifting tables are provided to perform the two-dimensional cyclic movement between the transfer table and the return position. Here, the movements of the two lifting tables are preferably interspaced in such a way that an upward movement of one of the lifting tables is always accompanied by a downward movement of the other lifting table.

In this embodiment of the device according to the invention, it is necessary to ensure that the two lifting tables do not obstruct each others' movements, in particular it must be possible to move one lifting table horizontally back from the upper return position and simultaneously to move the other lifting table at delivery height forward to the transfer table without the two lifting tables or their guides colliding with each other.

From this viewpoint, in an advantageous embodiment of the device according to the invention, one lifting table is configured in one piece while the second is configured in two pieces. In this case, the coupling of the one-piece lifting table to the drive units may be provided at half length, i.e. in the middle of the one-piece lifting table, while the two sections of the two-piece lifting table are individually coupled to the drive units, whereby the couplings are on the outside of the two sections. In particular, therefore, the one-piece lifting table is coupled by means of a slide to the first drive unit and by means of a slide to the second drive unit, while on the other hand for the coupling of the two-piece lifting table in each case two slides are provided for the first drive unit and two slides are provided for the second drive unit since each section of the two-piece lifting table is coupled separately to the first and second drive unit.

This embodiment has the advantage that during the simultaneous horizontal movement of the two lifting tables, in which one lifting table moves backward and the other moves forward, the two sections of the two-piece lifting table can move past the guide or the slides of the first lifting table at the side. Viewed in another way, during the horizontal movement, the slide of the one-piece lifting table moves between the two sections of the two-piece lifting table.

If two lifting tables are provided, the movements of the two lifting tables should be synchronised with each other. This may be achieved, for example, in that one slide in a drive unit is directly connected to the running rail in the crank mechanism and the other slides in the drive unit are coupled to the slide connected to the running rail by means of toothed belts and a synchronising shaft, for example, so that the oscillating movement is transferred from this slide to the other slides. If two lifting tables are provided, the slides in question are preferably clamped to the toothed belts displaced relative to each other by a half circumferential length of the toothed belts in order to ensure that an upward movement of one lifting table is always accompanied by a downward movement of the other lifting table and a horizontal backward movement of one lifting table is always accompanied by a horizontal forward movement of the other lifting table.

The supporting elements in the lifting table and the transfer table are preferably rotatable transport rollers whose rotational axes substantially lie perpendicular to the direction of transport of the workpiece. Here, the transport rollers may be driven in order to bring about the transfer of the workpiece by the lifting table to the return device in particular also after the lifting process.

BRIEF DESCRIPTION OF THE DRAWINGS

A preferred embodiment of the invention will now be described with reference to the drawings in which FIG. 3 shows two lifting tables in a return device according to the invention in four different operational positions, FIG. 4 shows a schematic plan view of a device according to the invention in a second embodiment, FIG. 6 shows a drive unit in a device according to the invention to produce an up and down movement of two lifting tables.

DETAILED DESCRIPTION OF A PREFERRED EMBODIMENT

Figure 1A:
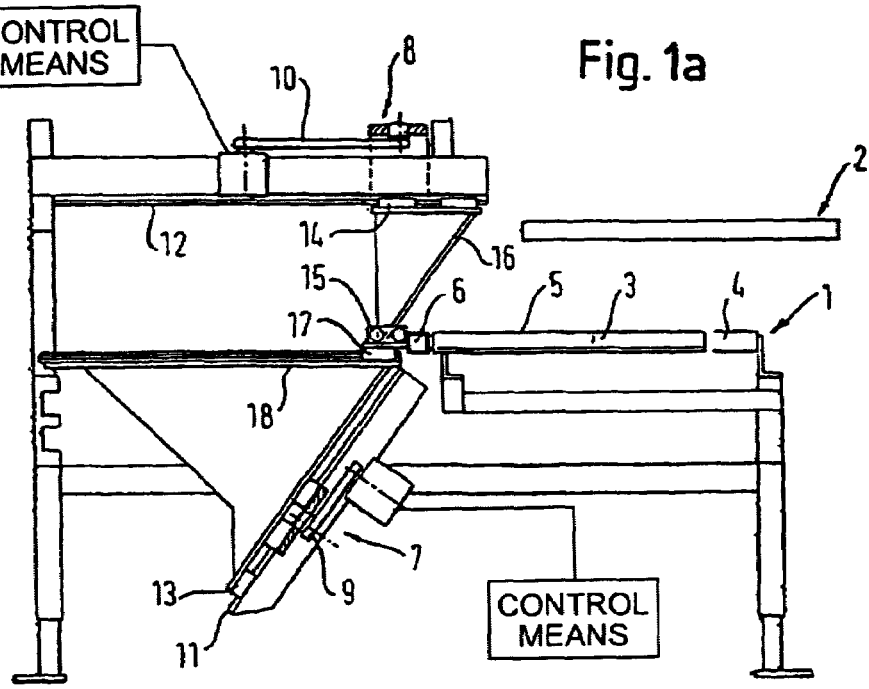
FIG. 1 shows a first embodiment of a return device according to the invention in four different operating positions.

FIG. 1 shows a device according to the invention for returning machined workpieces from the delivery side to the feeding side of a machining unit.

This is a schematic representation of a transfer device with a transfer table 1 on which workpieces machined in a (not shown) machining unit are delivered. The delivery of the machined workpieces onto the transfer table 1 takes place in the plane of projection shown in FIG. 1. The transfer table 1 comprises several interspaced transport rollers 4 whose rotational axes lie perpendicular to the transport direction of the workpieces and of which only one is visible in the drawings in each case.

A lifting device with a lifting table 3 is used to lift the workpieces from the transfer table 1 to a return device 2 from which the workpieces return to the feeding side of the machining unit. The workpieces are returned from the plane of projection shown in FIG. 1. The lifting table 3 also comprises transport rollers 5 whose rotational axes lie perpendicular to the transport direction of the workpieces in the machining unit. The transport rollers 5 of the lifting table 3 are attached to one side of a carrier element 6 so that a rake-type arrangement of the carrier element 6 and transport rollers 5 is formed (see also FIG. 3). In this way, it is possible for the transport rollers 5 of the lifting table 3 to reach between the transport rollers 4 in the transfer table.

The relevant operational position in which the transport rollers 5 of the lifting table 3 are located between the transport rollers 4 of the transfer table 1 is shown in FIG. 1a. In this setting, a workpiece located on the transfer table 1 can be collected by the transport rollers 5 of the lifting table 3 and conveyed upward, to be precise to the operational position shown in FIG. 1b in which the lifting table 3 is at the height of the return device 2. Here, the workpiece is then transferred from the lifting table 3 to the return device 2.

Figure 1B:
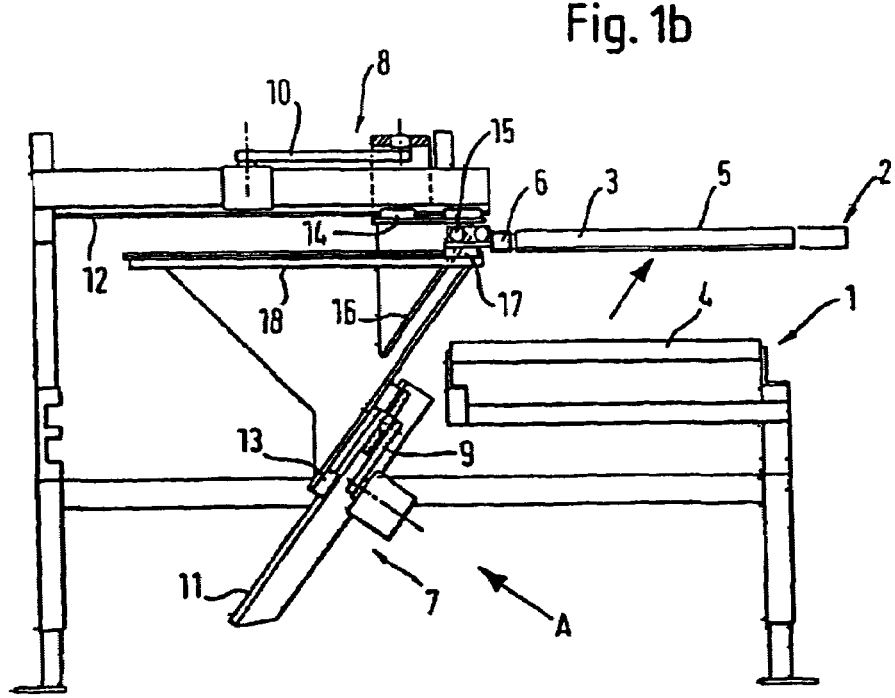

As soon as the lifting table 3 has upward moved far enough from the basic setting shown in FIG. 1a in the direction shown in FIG. 1b, another workpiece may move onto the transfer table 1. In this way, the throughput of the return device may be increased in an advantageous way. To enable this next workpiece on the transfer table 1 also to be conveyed to the return position by the transfer table 1, the lifting table 3 must now be returned from the upper position shown in FIG. 1b into the basic position shown in FIG. 1a so that the next workpiece already on the transfer table 1 may in turn be collected from below by means of the transport rollers 5 of the lifting table 3.

Figure 1C:
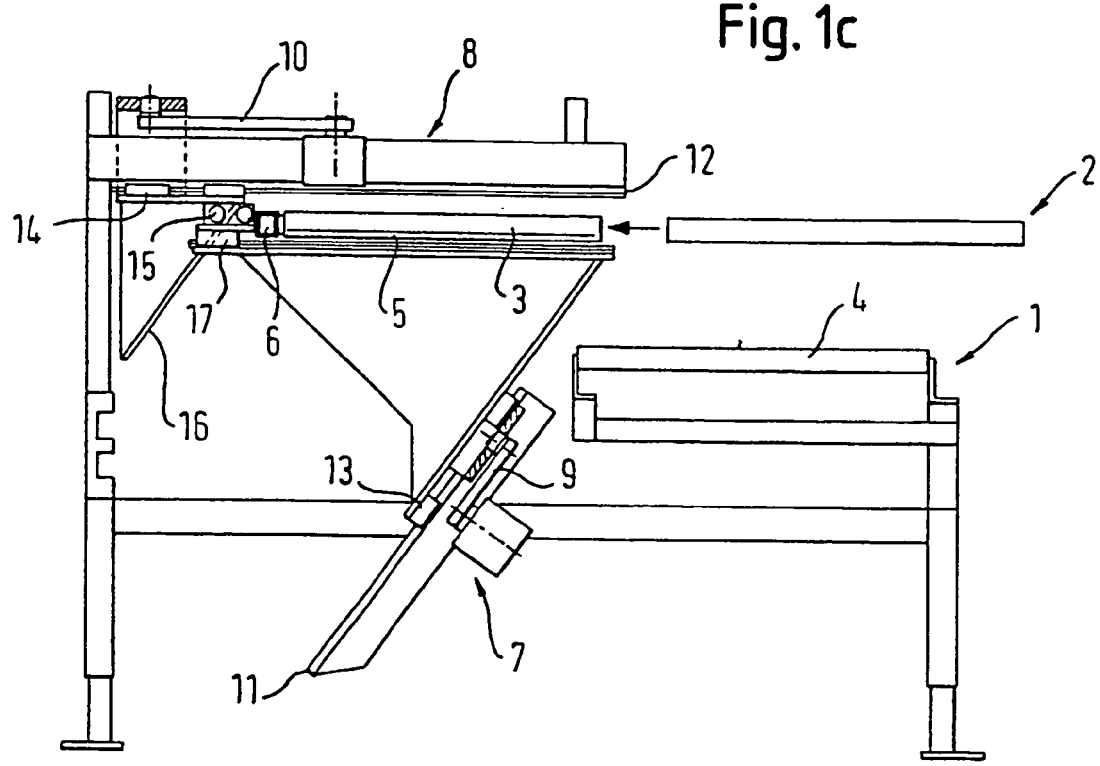

For this, the lifting table 3 is first returned from the return position (FIG. 1b) to the position shown in FIG. 1c, i.e. in the rear area of the machining device (toward the left in FIGS. 1a–d). From here, the lifting table 3 is moved downward as far as the position shown in FIG. 1d. A subsequent horizontal movement forward returns the lifting table 3 to the basic position shown in FIG. 1a, whereby the transport rollers 5 of the lifting table 3 are again guided between the transport rollers 4 of the transfer table 1. From this basic position, the lifting table 3 may then convey the next workpiece to the return device 2.

Figure 1D:
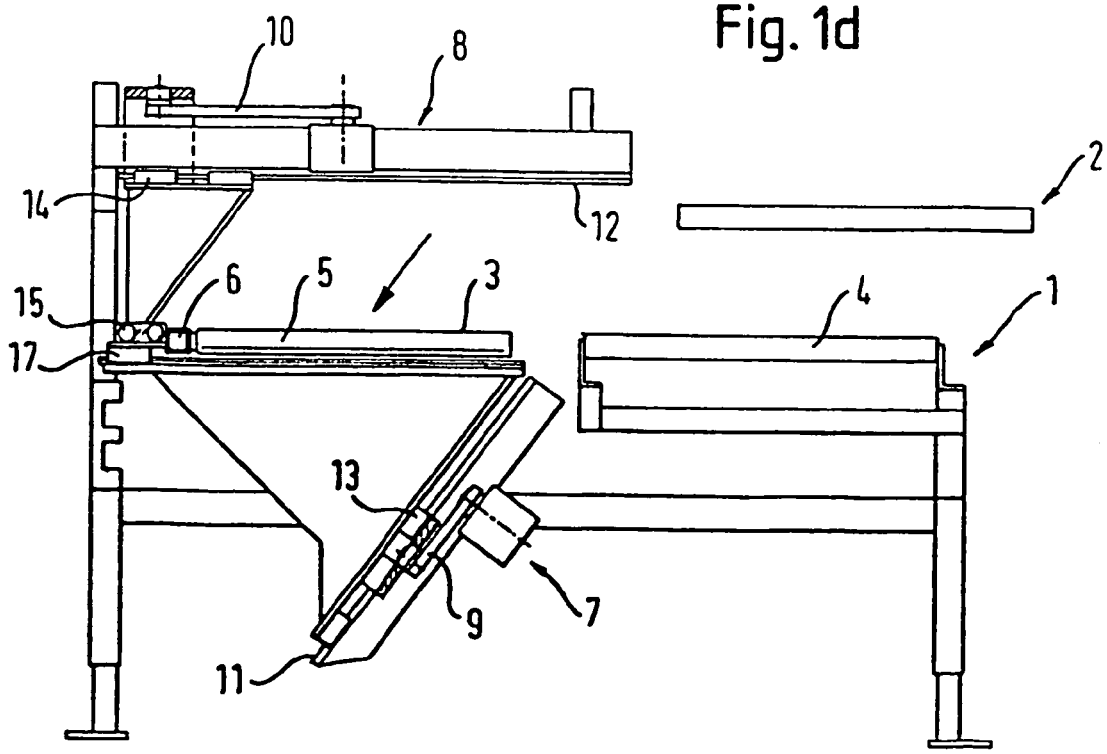

The movement of the lifting table 3 is hereby preferably coordinated by means of a (not shown) higher-level control and sensors (not shown) coupled thereto. As soon as a workpiece is delivered to the transfer table 1, which is detected by a sensor, and the lifting table 3 is in the basic setting (FIG. 1a), the lifting movement of lifting table 3 into the return position is performed. As soon as the lifting table 3 has reached the return position and the workpiece has been transferred to the return device 2, which is again detected by sensors, the horizontal movement of the lifting table 3 into the position showed in FIG. 1c is performed. When this movement has been completed, which is preferably detected by an end-position sensor, the movement downward into the position shown in FIG. 1d is performed and after its completion, the horizontal movement forward into the basic position (FIG. 1a).

In the example of an embodiment shown, both the up and down movement of the lifting table 3 and its horizontal movements are produced by means of drive units, in particular by crank mechanisms 7 or 8. Hereby, each of the two crank mechanisms 7, 8 has a crank 9, 10 whose free end runs into a running rail causing the rotary movement of the crank 9, 10 to be converted into a translatory back-and-forth movement of the running rail. The running rail is in turn coupled to slides 13, 14 used to guide the lifting table. Here, the slides 13, 14 are guided by means of guide rails 11, 12.

The precise embodiment and the mode of operation of the crank mechanisms 7, 8 and slides 13, 14 are also shown in FIGS. 1a–d. From the basic position shown in FIG. 1a, the first crank mechanism 7, which is used to produce the up and down movement of the lifting table 3, first performs a half revolution so that the crank 9 in the first crank mechanism 7 moves out of the lower position shown in FIG. 1a into the upper position shown in FIG. 1b and hereby moves the running rail and the slide coupled thereto upward. In this way, the slide 13 moves the lifting table 3 upward whereby the coupling between the slide 13 and lifting table 3 is implemented by means a horizontally running driver rail 18 connected to the slide and a guide element 17 which is arranged slidably on the driver rail 18. During the upward movement, the lifting table 3 also runs along by means of rollers 15, which are attached in the vicinity of the carrier element 6, on the driver 16 in the second slide 14.

This driver 16 simultaneously represents the coupling between the lifting table 3 and the second slide 14 which ensures that the subsequent horizontal backward movement of the second slide 14 is transferred to the lifting table 3. This horizontal movement from the position shown in FIG. 1b into the position shown in FIG. 1c is produced by means of the second crank mechanism 8 whose crank 10 performs a half revolution and hereby conveys the associated running rail, the second slide 14 connected thereto and hence, by means of the driver 16 also the lifting table 3, backward. Hereby, the lifting table 3 moves by means of its guide element 17 along on the driver rail 18 which in turn is connected to the first slide 13. The first crank mechanism 7 and hence also the first slide 13 remain still during this.

In a similar way, this is then followed by the downward movement of the lifting table 3 produced by a half rotation of the first crank mechanism 7 and the horizontal movement of the first crank mechanism 7 and the horizontal movement forward produced by the second crank mechanism 8 until the basic setting in FIG. 1a is achieved again.

Figure 2:
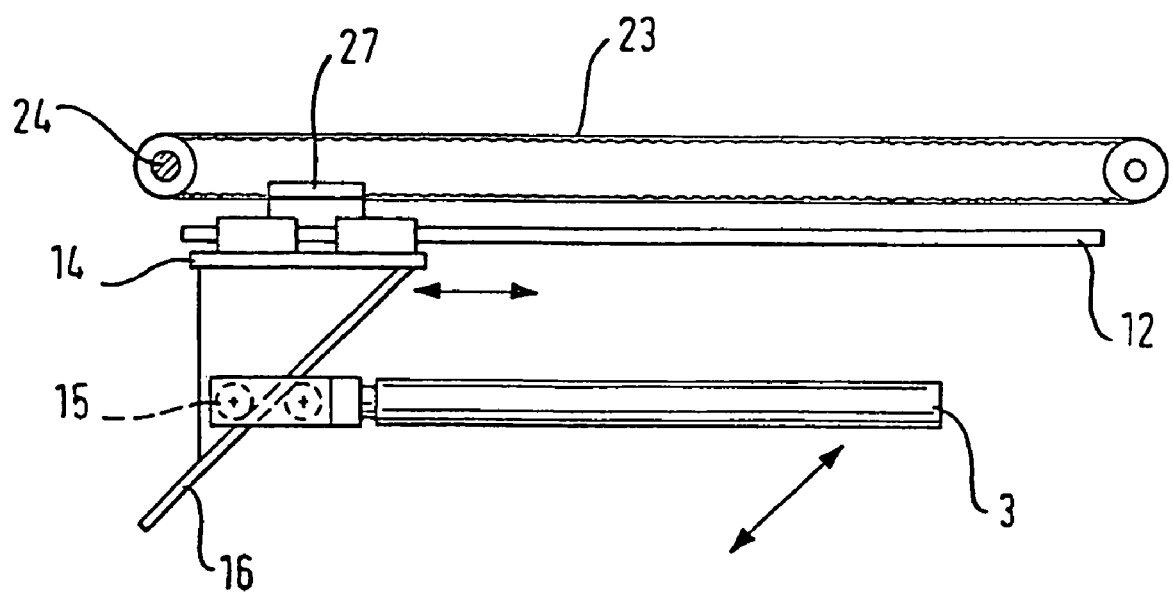
FIG. 2 shows a detailed view of a lifting table in a return device according to the invention together with its coupling to a drive unit.

FIG. 2 shows even more precisely a lifting table 3 in an arrangement according to the invention which by means of rollers 15 is able to run on a driver 16 of a slide 14. The slide 14 is in turn guided by means of a guide rail 12. The slide 14 is also connected by means of a clamp 27 to a toothed belt 23. A horizontal movement of a running rail produced by a crank mechanism (not shown in FIG. 2) is transferred to the toothed belt 23 since the toothed belt 23 is coupled by means of a synchronising shaft 24 to another toothed belt which is in turn connected to the crank mechanism's running rail. This coupling of the slide and the running rail by means of toothed belts is explained in more detail below in connection with another embodiment of the invention.

While FIGS. 1a–d show an embodiment of the invention with only one lifting table, it is also possible to use several lifting tables simultaneously in order to increase the throughput of the device. The individual lifting tables must then be suitably configured to ensure they do not obstruct each other's movements.

In this regard, FIG. 3 is a schematic representation of two lifting tables 3; 3', 3" which may be used simultaneously in a return device according to the invention. FIG. 3d also shows schematically rollers 4 in a transfer device and a return conveyor 9, whereby the conveying device for the workpieces in the machining unit or on the return conveyor 9 is indicated by arrows.

The first lifting table 3 is configured in one piece, while the second lifting table consists of two sections 3', 3".

Figure 5A:
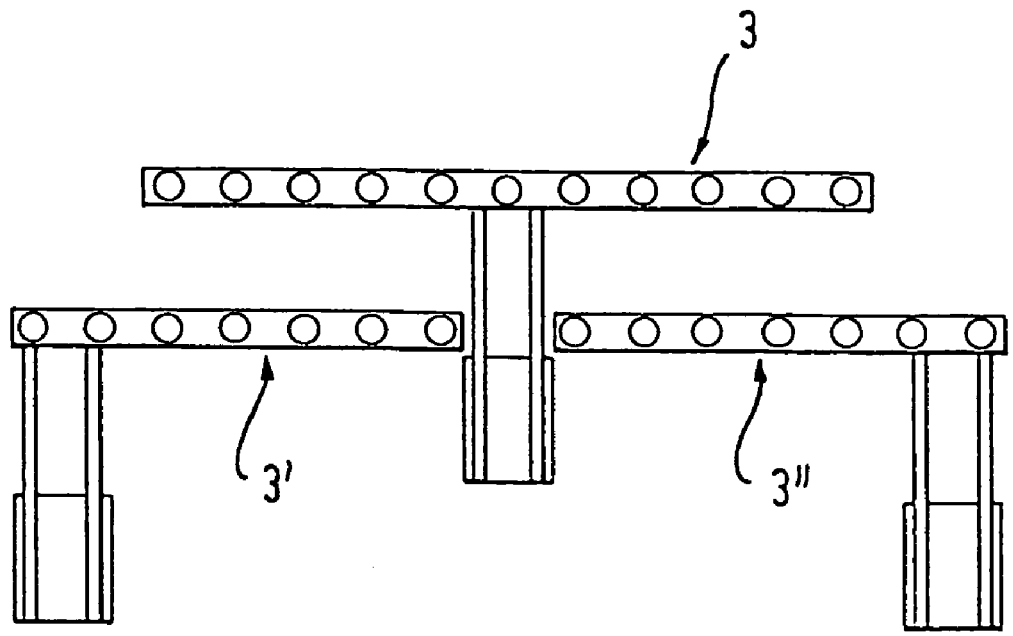
FIG. 5 shows a schematic view of two lifting tables in a device according to the invention.
Figure 5B:
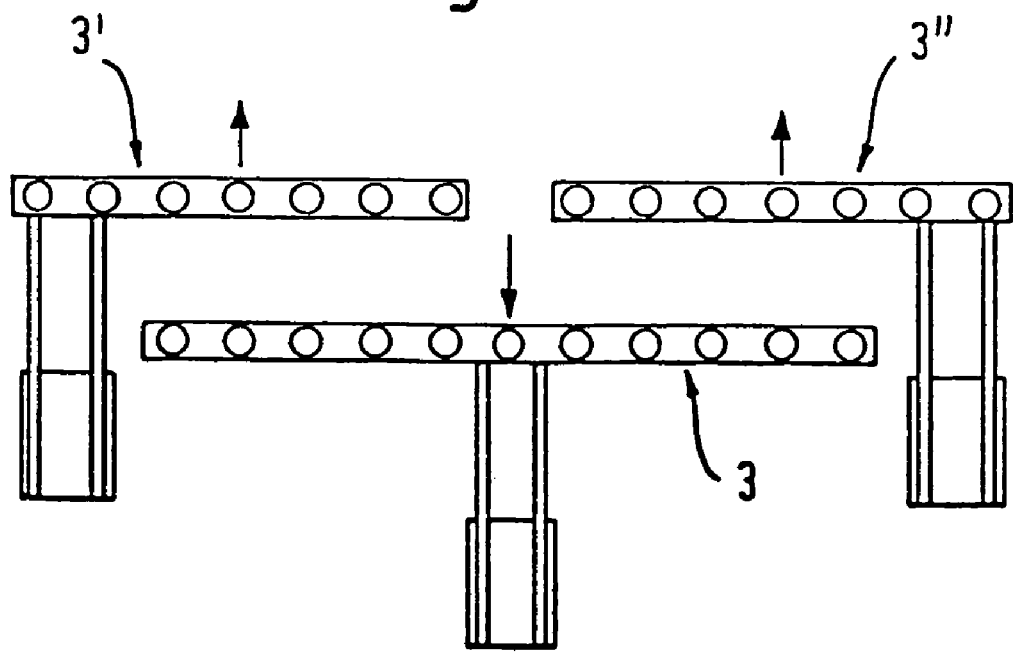

The two lifting tables 3; 3', 3" are now moved by the drive units, in particular by two crank mechanisms in such a way that they execute the up and down movement and the horizontal movement, each in opposite directions: when one lifting table moves upward, the other moves downward and when one lifting table moves forward, the other moves backward. These operations are clearly evident in FIGS. 3a–d. From the basic position shown in FIG. 3a, in which the first, one-piece lifting table 3 is at the height of the transfer table, this first lifting table 3 travels upward, while the two sections 3', 3" of the second lifting table move downward until the position shown in FIG. 3b is achieved. Now a workpiece on the first lifting table 3 may be transferred to the return device 2. Then, the first lifting table 3 returns to the upper position while the two sections 3', 3" of the second lifting table in the lower position move forward (FIG. 3c). This horizontal movement of the two lifting tables relative to each other is facilitated by the special embodiment of the second lifting table in two sections 3', 3"; to be precise, during the horizontal movement, the two sections 3', 3" of the second lifting table go past a guide 19 of the first lifting table 3 at the side. The coupling of the two sections 3', 3" with the associated slides is provided by means of guides (not shown here) which are preferably attached on the outside of the two sections 3', 3" so that they do not obstruct the relative horizontal movement of the lifting tables 3; 3', 3" (see also FIG. 5).

In a similar way, there is then a up and down movement of the lifting tables 3; 3', 3" into the position shown in FIG. 3d during which the second lifting table 3' 3" is now able to transport a workpiece from the transfer table to the return device 2 followed by another horizontal movement back into the basic setting (FIG. 3a).

Here, the movements of the two lifting tables 3; 3', 3" are coupled to each other in such a way that the movement of the crank in a crank mechanism is transferred to the associated running rail and from there via toothed belts and a synchronising shaft to all the slides in a drive unit.

FIG. 4 shows a schematic plan view of a device according to the invention with two lifting tables whereby once again one lifting table 3 is configured in one piece and the other comprises two sections 3', 3", The plan view also shows the transfer device 1 with its transport rollers 4 between which the transport rollers 5 of the lifting tables 3; 3', 3" may be guided. In the position shown, the one-piece lifting table is already undergoing a upward movement in the area of the transfer device 1 while the two-piece lifting table 3', 3" is in the rear area of the devices and being guided downward. FIG. 4 also depicts how the lifting tables are guided in such a way that they do not obstruct each other during the horizontal movements relative to each other.

In front of the transfer device 1, there is a roller conveyor 19 which rotates a workpiece issued from a machining unit about 90° so that when it has been rotated, it is lifted from the lifting table and then returned. At the feeding side, the workpiece may then be reinserted in the machining unit without having to be rotated again in order to machine another edge of the workpiece. Reference No. 20 designates a positive pressure at which at least one roller is driven and which is used to convey the workpieces from the lifting table 3; 3', 3" to the return device 2.

FIGS. 5a and b once again show two lifting tables 3 or 3', 3" in a device according to the invention with their guides, and the possible relative movements of the two lifting tables are again clear: regardless of whether the one-piece lifting table 3 (FIG. 5a) or the two-piece lifting table 3', 3" (FIG. 5b) is in the upper position (FIG. 5a), a horizontal movement (perpendicular to the plane of projection in FIG. 5) of the two lifting tables 3; 3', 3" relative to each other is possible.

FIG. 6 shows a first crank mechanism 7 in a device according to the invention that produces an up and down movement of two lifting tables 3 or 3', 3". (FIG. 6 corresponds to a view of the crank mechanism 7 from direction A in FIG. 1b, but shows an embodiment with two lifting tables.)

The slides 13 in the first lifting table 3 which are guided by means of guide rails 11 are clamped to toothed belts 21b, 21c. The toothed belts 21b, 21c are coupled by means of a synchronising shaft 22 with other toothed belts 21a, 21d to which slides 13', 13" for the two sections 3', 3" of the second lifting table are clamped. In this way, the up and down movement of the running rail 25 produced by the crank mechanism 7 is transferred to the slides 13 of the first lifting table 3, to the toothed belts 21b, 21c, to the synchronising shaft 22 and via the toothed belts 21a, 21d to the slides 13', 13" of the second lifting table 3', 3". Here, the slides 13 are clamped to the toothed belt in question displaced by a half circumferential length of the toothed belts relative to the slides 13', 13" (see FIG. 6a) so that in each case one lifting table 3; 3', 3" moves upward while the other moves downward.

Figure 7B:
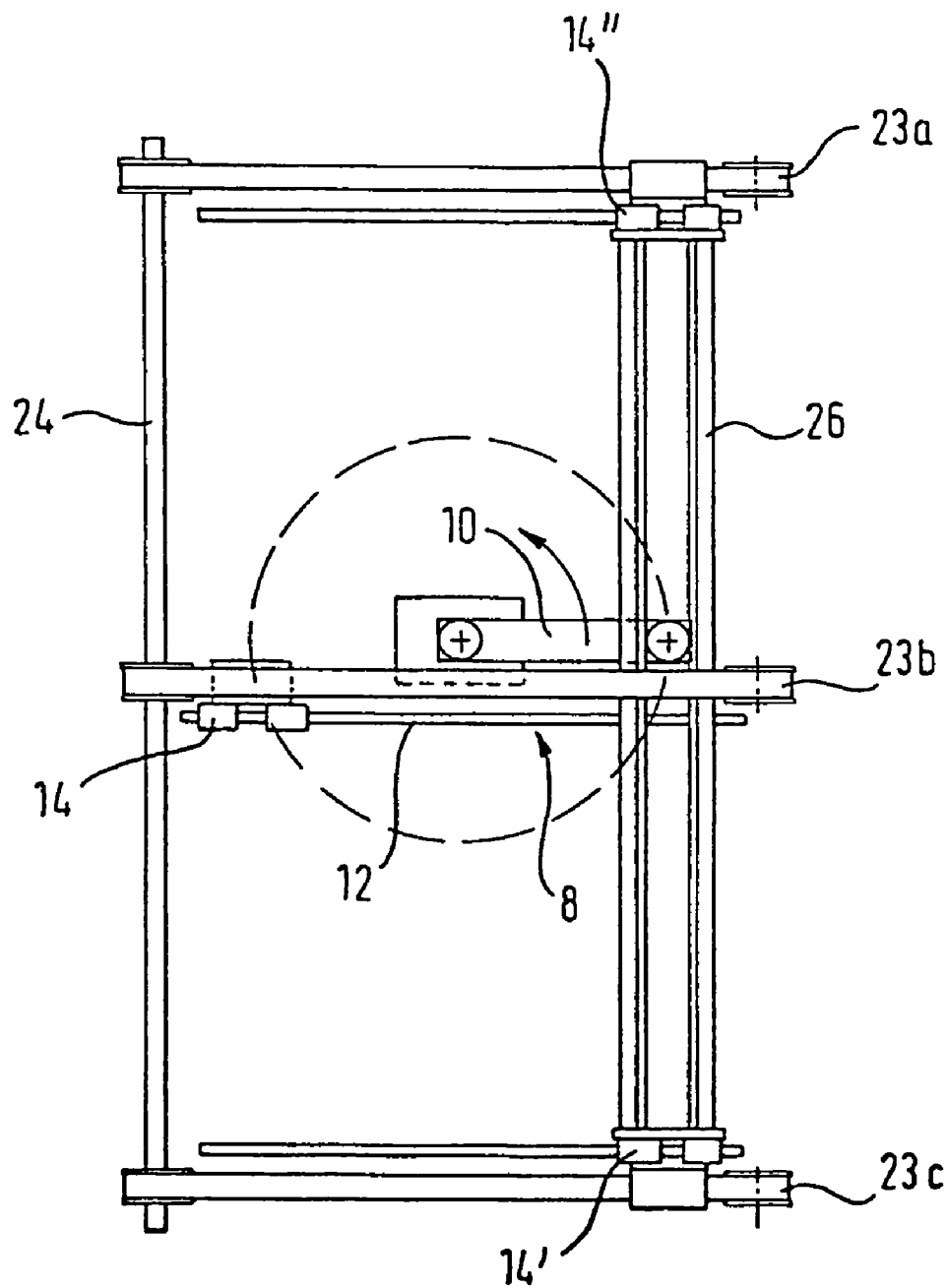
FIG. 7 shows a drive unit in a device according to the invention to produce a horizontal movement of two lifting tables.
Figure 7A:
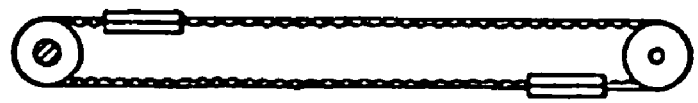

FIG. 7 shows a second crank mechanism 8 for the production of the horizontal movement of the two lifting tables. Similarly to the case with the first crank mechanism 7, a slide 14 of the first lifting table 3 is clamped to a toothed belt 23b and runs on a guide rail 12. Slides 14', 14" of the two-piece lifting table 3', 3" are clamped to toothed belts 23a, 23c and the two toothed belts are coupled by means of a synchronising shaft 24. The two slides 14', 14" of the two-piece lifting table are hereby connected to a running rail 26 which is driven by the crank mechanism 8 and its movement is transferred via the toothed belt 23a, 23c and the synchronising shaft 24 to the toothed belt 23b and hence to the slide 14 of the one-piece lifting table 3. The actual lifting tables are not shown in FIG. 7.

Figure 8:
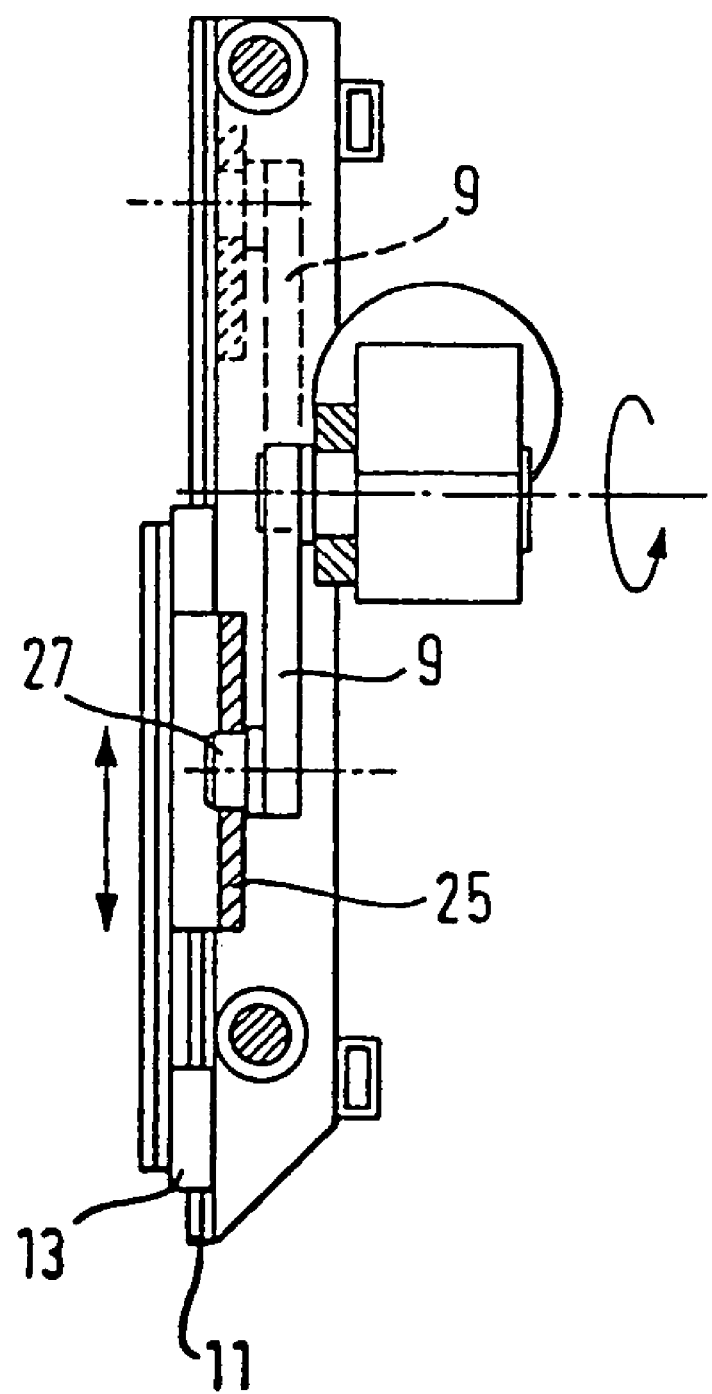
FIG. 8 shows a detailed view of a crank mechanism in a device according to the invention.

Finally, FIG. 8 shows a detailed view of a crank mechanism in a device according to the invention. This shows two positions of a crank 9 and the running rail 25, the slide 13 and the guide rail 11. The free ends of the crank 9 supports a roller 27.

The invention claimed is:

1. A device for returning machined workpieces from the delivery side of a first machining unit to the feeding side of the first or of another machining unit, said device comprising:
a transfer device for transferring the machined workpieces from the delivery side of the first machining unit,
a lifting device for lifting the workpieces which are delivered by the transfer device to a return position located above the transfer device, and
a return device for conveying the workpieces which are delivered by the lifting device back to the feeding side of the first or the other machining unit,
the transfer device comprising a transfer table with interspaced first supporting elements for the supporting workpieces, and the lifting device comprising first and second lifting tables, each having interspaced second supporting elements for supporting the workpieces which can be upwardly guided between the first supporting elements of the transfer table, a first drive unit for producing a substantially up and down movement of the first and second lifting tables and a second drive unit for producing a substantially horizontal movement of the first and second lifting tables, wherein the first and second drive units move the first and second lifting tables in at least a two-dimensional cyclic movement from the transfer table upward to the return position and back to the transfer table, wherein said first and second lifting tables perform the at least two-dimensional cyclic movement between the transfer table and return position simultaneously, with the first lifting table being configured in one piece and the second lifting table being configured in two pieces, said transfer device further including a first coupling means for coupling the first lifting table to the first and second drive units at a mid-point of the first lifting table and a second coupling means for coupling the two pieces of the second lifting table to the first and second drive units at an outer side of these two pieces.

2. Device according to claim 1, wherein each lifting table performs an oscillating up and down movement and a substantially horizontal oscillating movement.

3. Device according to claim 1 or 2, wherein the movement is in a plane perpendicular to the transport direction of the workpieces.

4. Device according to claim 1, wherein the transfer table is a fixed transfer table.

5. Device according to claim 1, wherein the first and second drive units each have a crank mechanism.

6. Device according to claim 5, wherein each crank mechanism comprises a driven rotational axis to which a crank is attached.

7. Device according to claim 6, wherein for each of the first and second lifting tables a running rail is provided in which a free end of each crank is guided and which is coupled to the associated lifting table so that its oscillating movement is transferred to the associated lifting table.

8. Device according to claim 7, wherein the running rail comprises hardened bars to accommodate the free end of each crank.

9. Device according to claim 6, wherein the free end of each crank supports a roller that can travel in the longitudinal direction of the running rail.

10. Device according to claim 1, wherein the first and second drive units are synchronised with each other.

11. Device according to claim 1, including a control means to control the first and second drive units.

12. Device according to claim 1, wherein the first and second coupling means each include at least one slide that is moved by the corresponding drive unit and is connected to the associated lifting table.

13. Device according to claim 12, wherein the movement of each slide is guided by at least one guide rail.

14. Device according to claim 12 or 13, wherein each slide comprises at least one engaging member on which the associated lifting table is mounted with a degree of freedom of movement.

15. Device according to claim 14, wherein said at least one engaging member is configured as a rod and the first and/or the second lifting table includes rollers mounted on the engaging member.

16. Device according to claim 14, wherein said at least one engaging member is configured as a rail and the first and/or the second lifting table includes a guide element mounted on the rail.

17. Device according to claim 7, wherein at least one slide is coupled to the running rail of each crank mechanism.

18. Device according to claim 2, wherein the movements of the two lifting tables are interspaced from each other by a half cycle so that an upward movement of one lifting table is always accompanied by a downward movement of the other lifting table.

19. Device according to claim 12, wherein the movements of the lifting tables are synchronised with each other.

20. Device according to claim 19, wherein the at least one slide of each drive unit is synchronised with each other by clamping the slide with a toothed belt and the toothed belts of the drive units are coupled to each other by means of a synchronising shaft.

21. Device according to claim 20, wherein in each drive unit the clamping of the at least one slide of the first lifting table with a toothed belt is offset by one half the circumferential length of the toothed belts relative to the clamping of the at least one slide of the second lifting table with a toothed belt so that an upward movement of one lifting table is always accompanied by a downward movement of the other lifting table and a horizontal forward movement of one lifting table is always accompanied by a horizontal backward movement of the other lifting table.

22. Device according to claim 1, wherein the second supporting elements of each lifting table are rotatable transport rollers whose rotational axes lie substantially perpendicular to the direction of transport of the workpieces.

23. Device according to claim 1, wherein the first supporting elements of the transfer table are rotatable transport rollers whose rotational axes lie substantially perpendicular to the direction of transport of the workpieces.

24. Device according to claim 22 or 23, wherein the transport rollers are driven.

25. Device according to claim 8, wherein the hardened bars are glued in place.

* * * * *